(12) United States Patent
Thompson, III (10) Patent No.: US 7,171,778 B1
(45) Date of Patent: Feb. 6, 2007

(54) INSECT TRAP SYSTEM

(76) Inventor: Vincent L. Thompson, III, 7004 S. Dewey Rd., Amherst, OH (US) 44001

(*) Notice: Subject to any disclaimer, the term of this patent is extended or adjusted under 35 U.S.C. 154(b) by 0 days.

(21) Appl. No.: 11/207,985

(22) Filed: Aug. 19, 2005

(51) Int. Cl.
*A01M 1/14* (2006.01)
(52) U.S. Cl. .................. 43/114; 43/107; 43/132.1; 43/121
(58) Field of Classification Search .............. 43/114, 43/107, 121, 132.1; 452/67–69, 185, 187–192, 452/19
See application file for complete search history.

(56) References Cited

U.S. PATENT DOCUMENTS

| 431,537 | A |   | 7/1890  | Trenner   |         |
|---------|---|---|---------|-----------|---------|
| 671,961 | A |   | 4/1901  | Heinritz  |         |
| 696,536 | A |   | 2/1902  | Baker     |         |
| 813,196 | A | * | 2/1906  | Bien      | 43/114  |
| 1,480,539 | A | * | 1/1924 | Grecu     | 43/114  |
| 3,319,273 | A | * | 5/1967 | Solin     | 5/420   |
| 4,862,638 | A |   | 9/1989  | Stevenson | 43/114  |
| 5,119,586 | A |   | 6/1992  | Townsend  | 43/114  |
| 5,155,950 | A |   | 10/1992 | Burgeson  | 43/121  |
| 5,189,830 | A |   | 3/1993  | Montemurro | 43/121 |
| 5,357,902 | A |   | 10/1994 | Norval et al. | 119/157 |
| 5,367,983 | A |   | 11/1994 | Pound et al. | 119/53 |
| 5,381,557 | A |   | 1/1995  | Luria et al. | 2/16   |
| 5,607,434 | A |   | 3/1997  | Alvino    | 606/131 |
| 5,634,293 | A |   | 6/1997  | Mike et al. | 43/136 |
| 5,722,199 | A |   | 3/1998  | Demarest et al. | 43/113 |
| 5,849,262 | A |   | 12/1998 | Thomas et al. | 424/9.1 |
| 6,076,678 | A |   | 6/2000  | Clayton, Jr. | 206/579 |
| 6,568,005 | B2 | * | 5/2003 | Fleming et al. | 5/420 |
| 6,651,379 | B1 |   | 11/2003 | Nelson   | 43/136  |
| 2004/0128902 | A1 | | 7/2004 | Kollaers, Jr. et al. | 43/107 |

* cited by examiner

*Primary Examiner*—Darren W. Ark
*Assistant Examiner*—John D. Holman (57) ABSTRACT

A insect trap system for absorbing bodily fluids and preventing insects from spreading from a dead animal. The insect trap system includes a collection mat having a plurality of dividers defining a center zone and surrounding zones. An absorbent material is attached to the center zone with the surrounding zones filled with an adhesive for catching insects. The collection mat includes a folding portion for allowing folding of the collection mat into a compact storage position. A cuff having a conical shape has adhesive applied to the interior surface thereof. The cuff includes a slit for allowing positioning about the leg of an animal or a rope or other structuring supporting the animal.

10 Claims, 8 Drawing Sheets

INSECT TRAP SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to insect traps and more specifically it relates to an insect trap system for absorbing bodily fluids and preventing insects from spreading from a dead animal.

2. Description of the Related Art

Any discussion of the prior art throughout the specification should in no way be considered as an admission that such prior art is widely known or forms part of common general knowledge in the field.

Insect and rodent traps comprised of sticky materials have been used for years. Typically, insect traps are typically comprised of an elongated sticky paper that is hung so that flying insects engage and are attached to the same. Rodent traps are typically comprised of a square tray structure with the sticky material positioned within along with bait to catch the rodents.

However, none of the insect traps currently available address the problem encountered when hanging a dead animal (e.g. deer) that has been field dressed. Various types of insects (e.g. ticks, fleas and lice) on the dead animal will start to abandon the host animal immediately upon death with the entire process taking up to 48 or more hours to complete. These insects are typically able to move freely to various parts of a building or outside thereof increasing the likelihood of any disease carrying insects infecting a human.

While these devices may be suitable for the particular purpose to which they address, they are not as suitable for preventing insects from spreading from a dead animal. Conventional insect traps are not designed for absorbing the body fluids of a dead animal while simultaneously ensuring that insects are not allowed to leave the area of the dead animal.

In these respects, the insect trap system according to the present invention substantially departs from the conventional concepts and designs of the prior art, and in so doing provides an apparatus primarily developed for the purpose of preventing insects from spreading from a dead animal.

BRIEF SUMMARY OF THE INVENTION

In view of the foregoing disadvantages inherent in the known types of insect traps now present in the prior art, the present invention provides a new insect trap system construction wherein the same can be utilized for absorbing bodily fluids and preventing insects from spreading from a dead animal.

The general purpose of the present invention, which will be described subsequently in greater detail, is to provide a new insect trap system that has many of the advantages of the insect traps mentioned heretofore and many novel features that result in a new insect trap system which is not anticipated, rendered obvious, suggested, or even implied by any of the prior art insect traps, either alone or in any combination thereof.

To attain this, the present invention generally comprises a collection mat having a plurality of dividers defining a center zone and surrounding zones. An absorbent material is attached to the center zone with the surrounding zones filled with an adhesive for catching insects. The collection mat includes a folding portion for allowing folding of the collection mat into a compact storage position. A cuff having a conical shape has adhesive applied to the interior surface thereof. The cuff includes a slit for allowing positioning about the leg of an animal or a rope or other structuring supporting the animal.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an insect trap system that will overcome the shortcomings of the prior art devices.

A second object is to provide an insect trap system for absorbing bodily fluids and preventing insects from spreading from a dead animal.

Another object is to provide an insect trap system that reduces the likelihood of the spread of insect related diseases (e.g. Lyme disease and Rocky Mounting Spotted Fever).

An additional object is to provide an insect trap system that may be utilized for various types of animals.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 8 illustrate an insect trap system 10, which comprises a collection mat 20 having a plurality of dividers 30 defining a center zone and surrounding zones. An absorbent material 22 is attached to the center zone with the surrounding zones filled with an adhesive 24 for catching insects. The collection mat 20 includes a folding portion 40 for allowing folding of the collection mat 20 into a compact storage position. A cuff 50 having a conical shape has adhesive 24 applied to the interior surface thereof. The cuff 50 includes a slit 56 for allowing positioning about the leg of an animal 12 or a rope or other structuring supporting the animal 12.

B. Collection Mat

Figure 2:
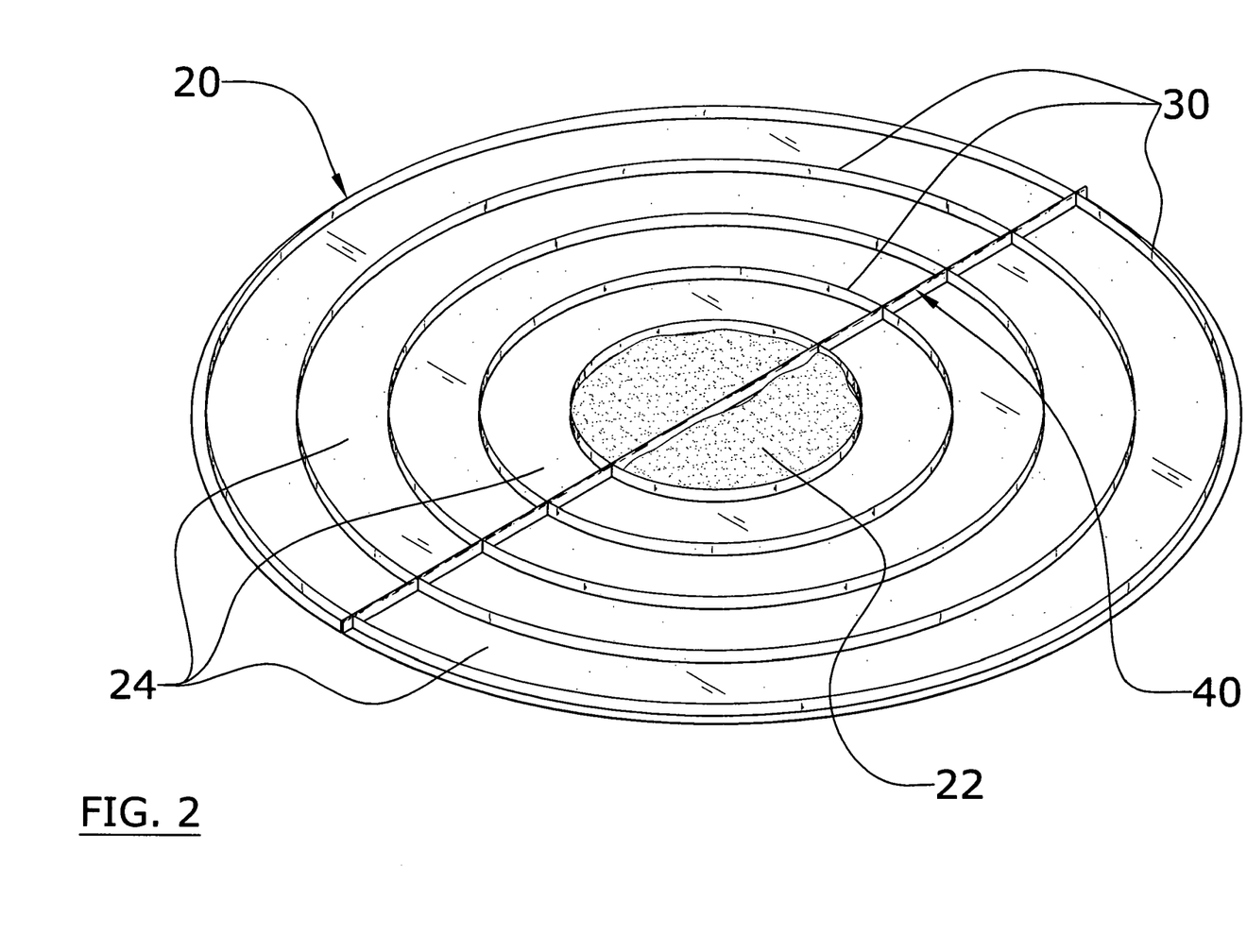
FIG. 2 is an upper perspective view of the collection mat.

The collection mat 20 has a floor 26, a plurality of dividers 30 and a folding portion 40 as illustrated in FIG. 2 of the drawings. The collection mat 20 is positionable beneath an animal 12 (e.g. deer) that is hanging for collecting the bodily fluids (e.g. blood, etc.) and for collecting the insects that leave the animal 12.

Figure 4:
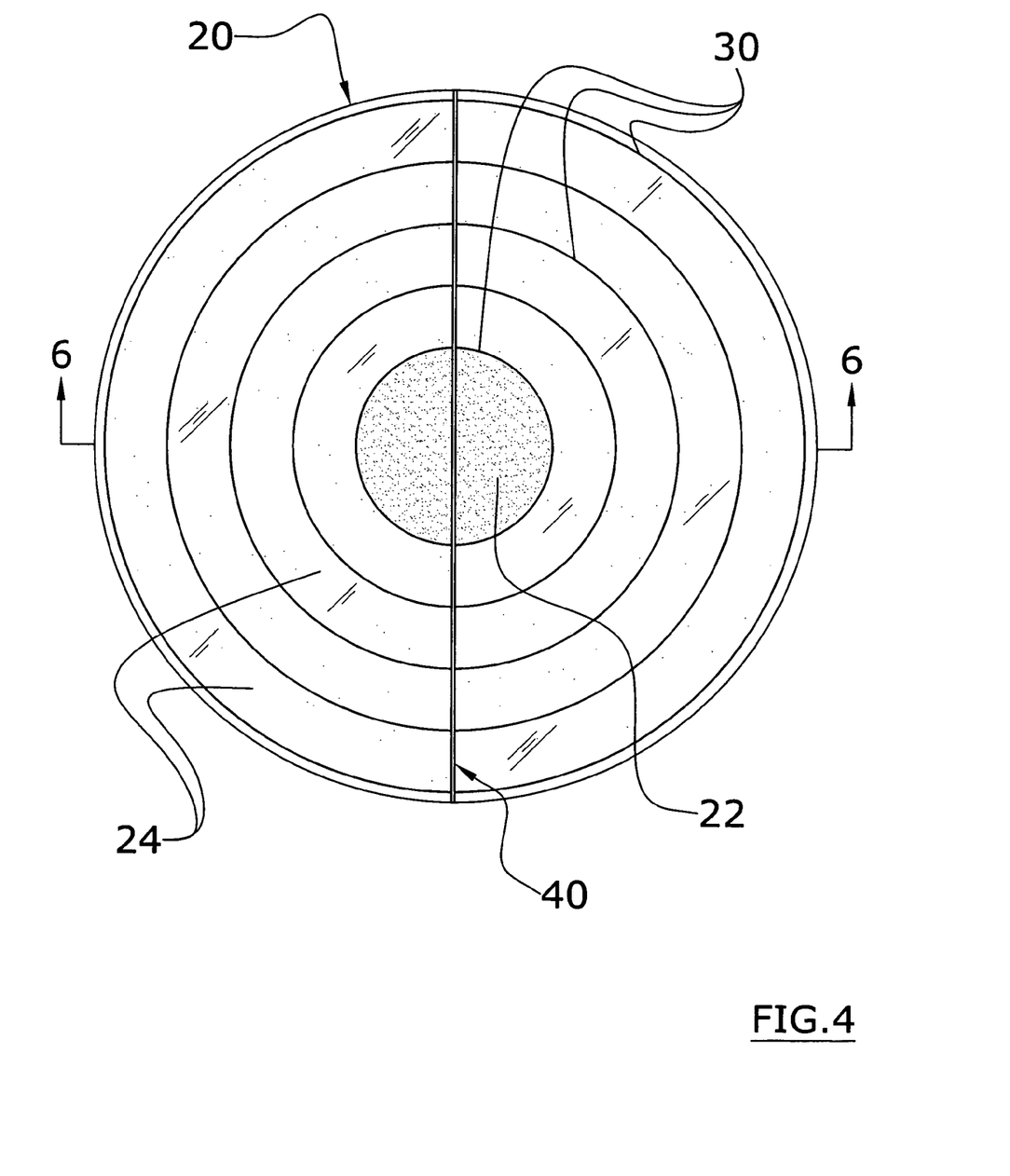
FIG. 4 is a top view of the collection mat.
Figure 6:
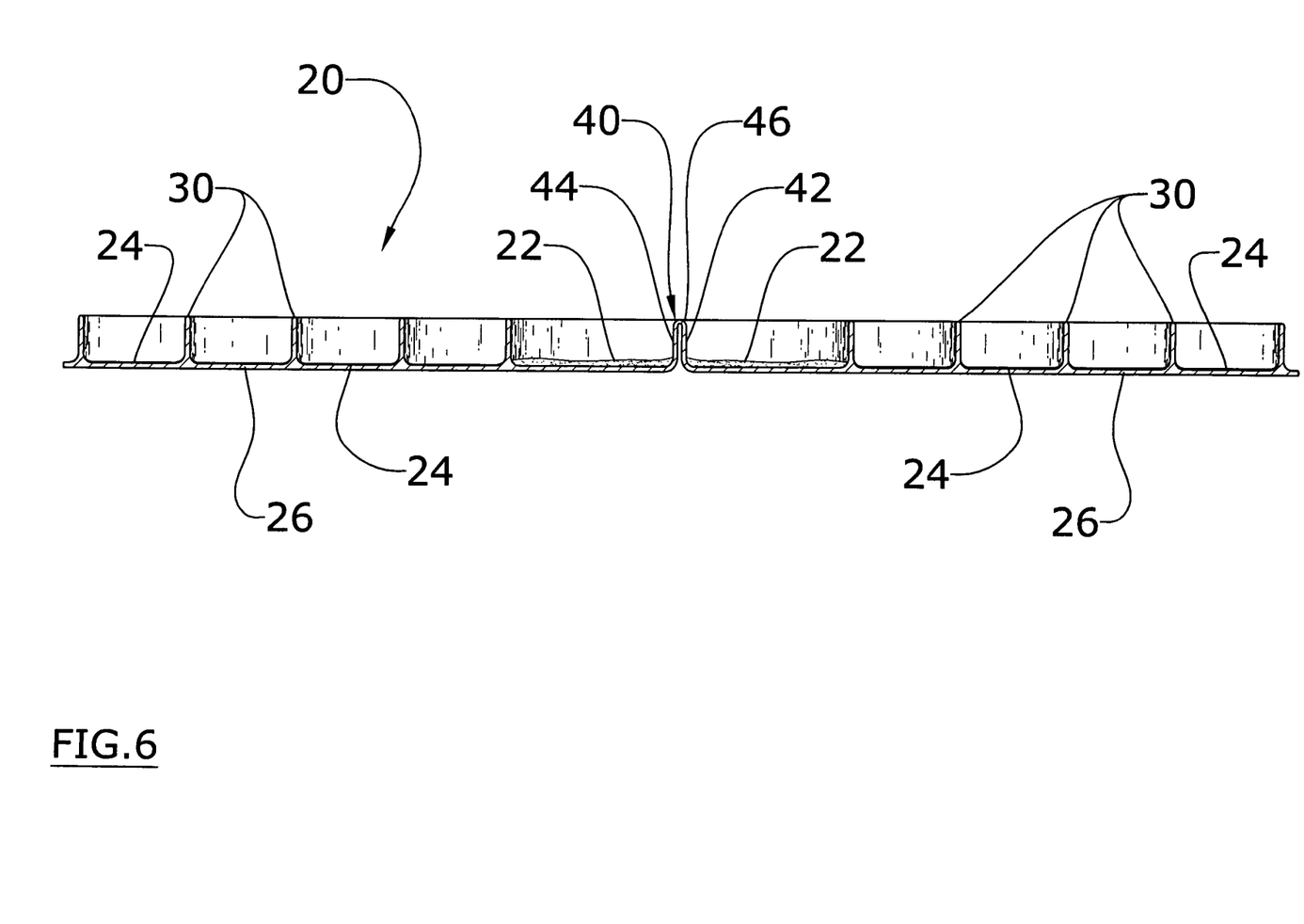
FIG. 6 is a cross sectional view along line 6—6 of FIG. 4.

The collection mat 20 may have various shapes and sizes, however the collection mat 20 is preferably comprised of a circular shape as best illustrated in FIG. 4 of the drawings. The collection mat 20 is also a generally flat structure as best illustrated in FIG. 6 of the drawings. The collection mat 20 is preferably constructed of a flexible material (e.g. rubber), however various other type of materials may be utilized to construct the collection mat 20.

The collection mat 20 preferably defines a center zone and at least one surrounding zone that surrounds the center zone. The center zone preferably has a circular shape, and the surrounding zone also preferably has a circular shape as illustrated in FIGS. 2 and 4 of the drawings. The center zone preferably has at least a ten inch diameter and the collection mat 20 has at least a three foot diameter.

C. Dividers

The plurality of dividers 30 are preferably concentrically extending upwardly from the floor 26 thereby defining the center zone and the at least one surrounding zone as shown in FIGS. 2 and 4 of the drawings. The dividers 30 are preferably comprised of a circular shape as further shown in FIGS. 2 and 4 of the drawings.

Figure 8:
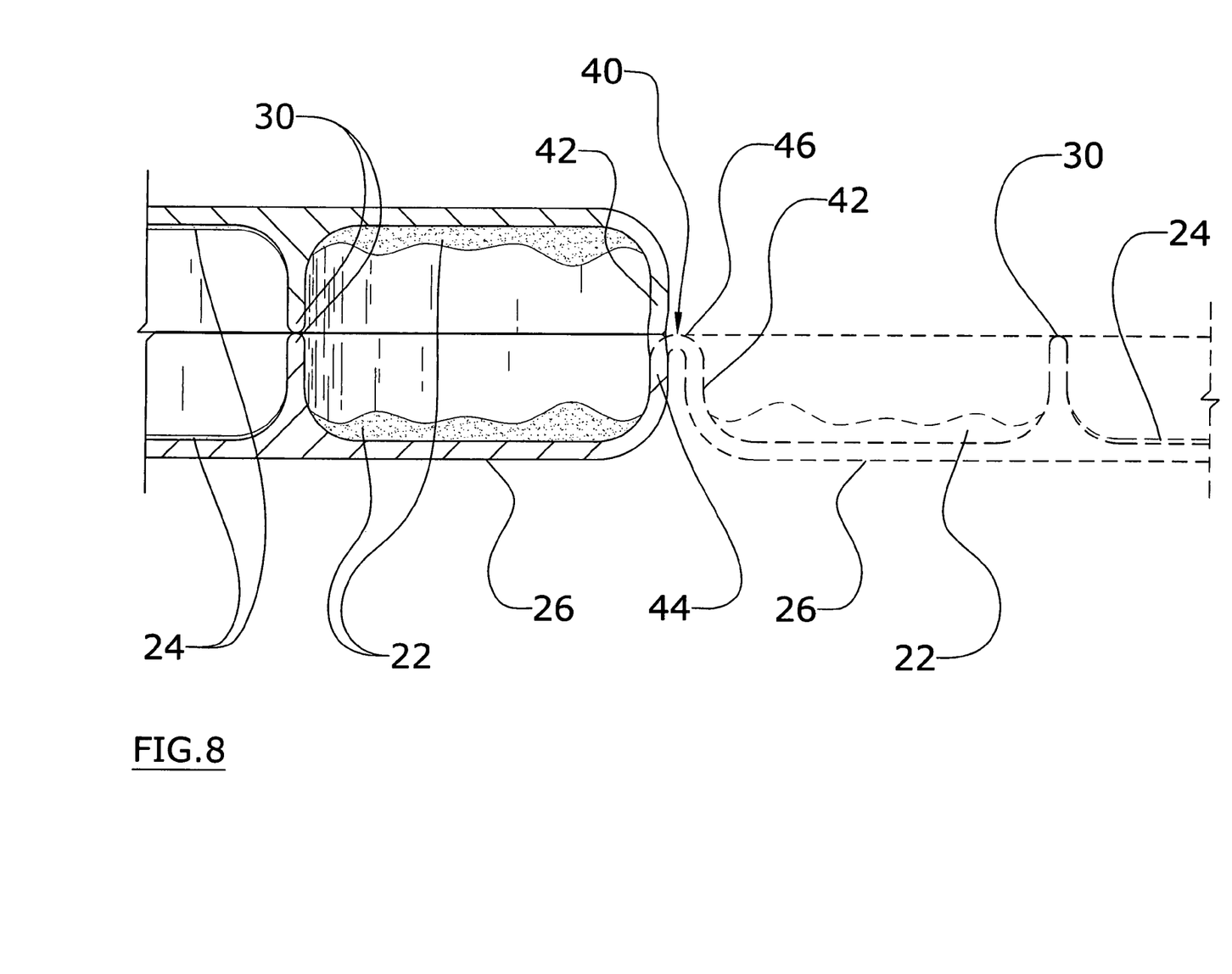
FIG. 8 is a magnified side cutaway view of the collection mat in the folded position.

The plurality of dividers 30 each have upper ends 52 that engage one another when the first half of the collection mat 20 is folded upon the second half of the collection mat 20 as best illustrated in FIG. 8 of the drawings. The folding of the upper ends 52 of the dividers 30 upon one another prevents the adhesive 24 from making contact within each half of the collection mat 20.

D. Folding Portion

Figure 7:
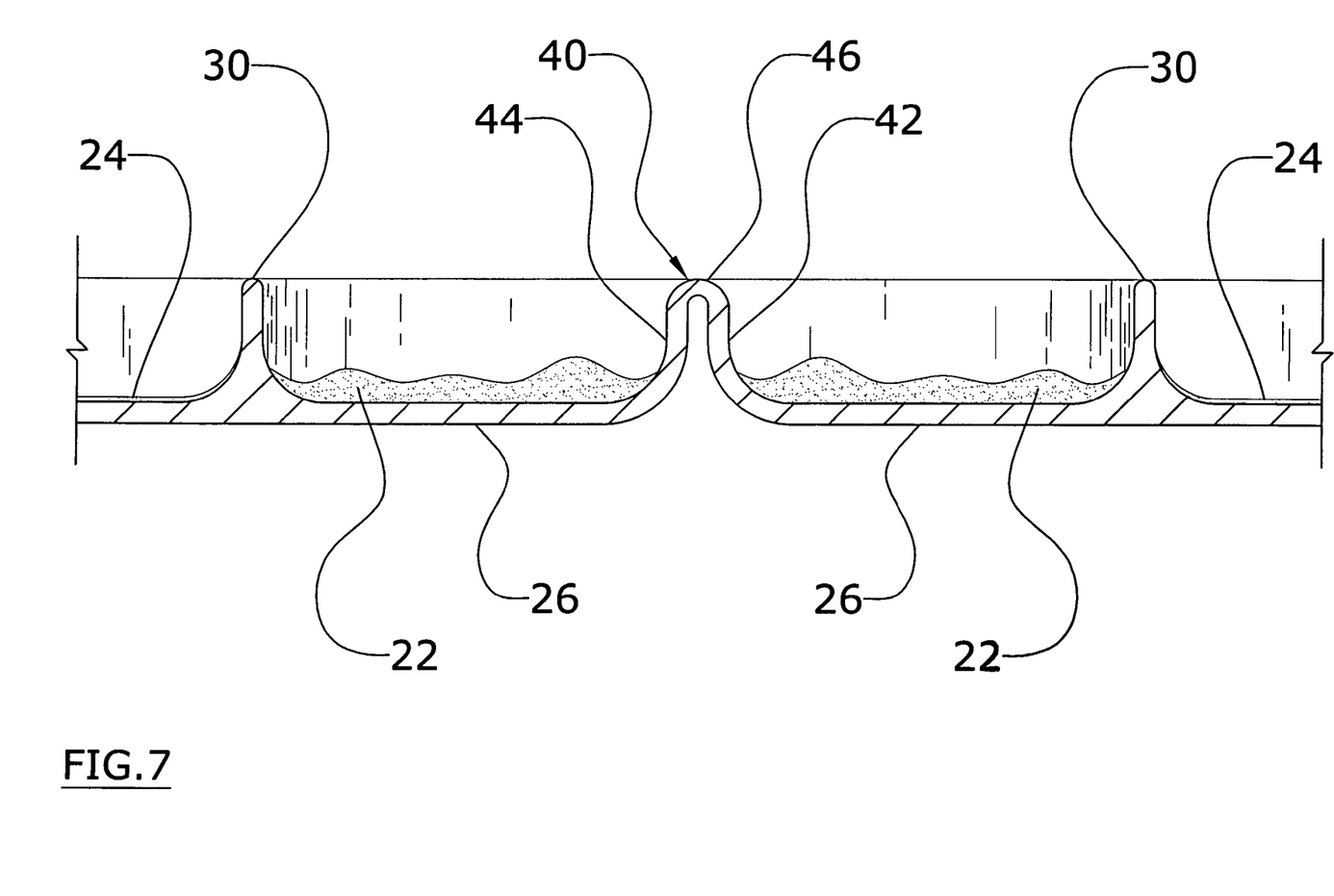
FIG. 7 is a magnified side cutaway view of the collection mat.

The folding portion 40 preferably extends across the collection mat 20 as best illustrated in FIGS. 2 and 4 of the drawings. The folding portion 40 is preferably comprised of a first portion 42 extending from a first half of the collection mat 20, a second portion 44 extending from a second half of the collection mat 20, and a hinge 46 attached to the first portion 42 and the second portion 44 as best illustrated in FIG. 7 of the drawings. The hinge 46 is preferably integrally formed with the first portion 42 and the second portion 44 as further shown in FIGS. 7 and 8 of the drawings.

E. Cuff

Figure 3:
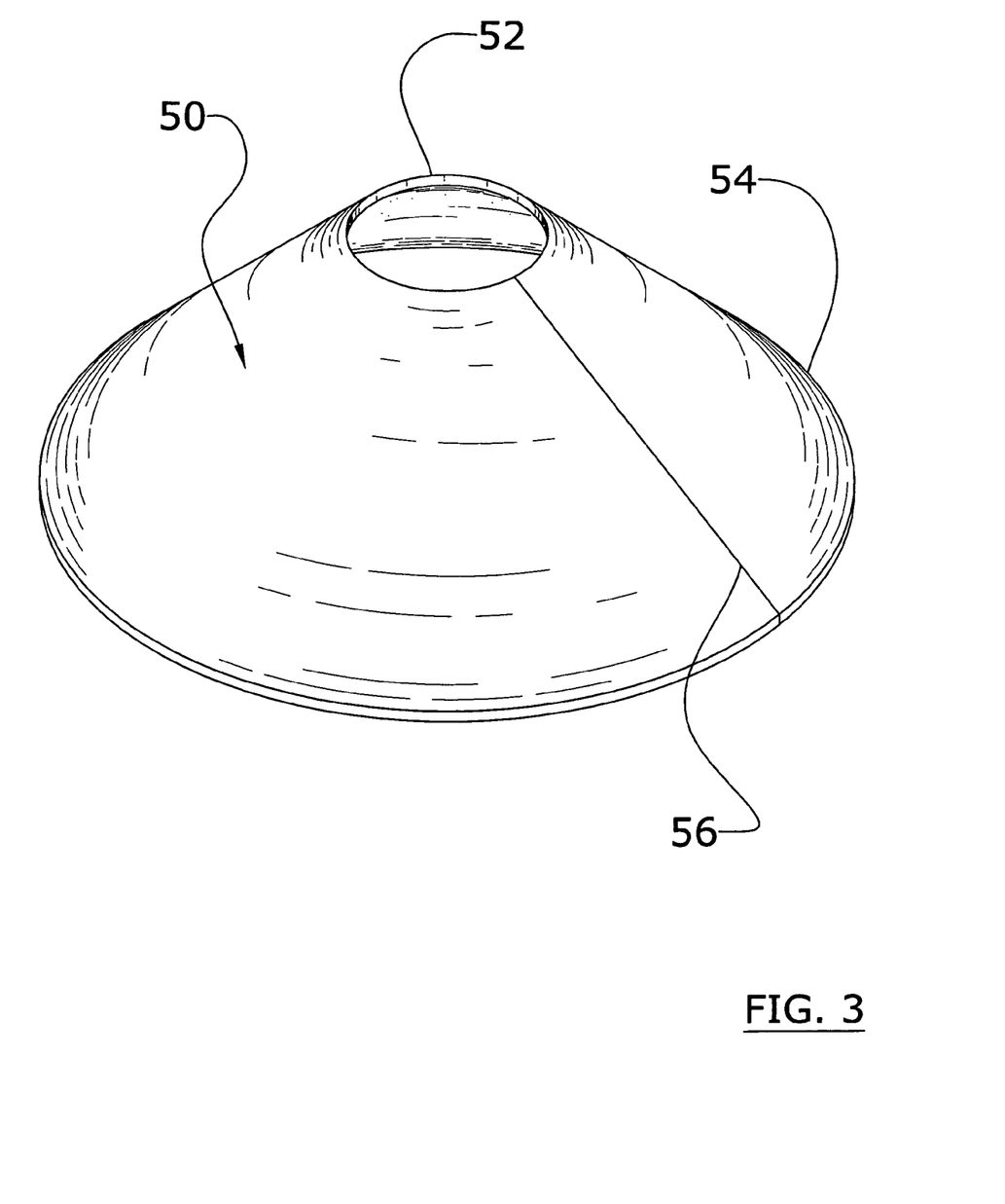
FIG. 3 is an upper portion of the cuff.

The cuff 50 preferably has a substantially conical shape as best illustrated in FIG. 3 of the drawings. The cuff 50 is designed to fit about the leg of an animal 12 or other structure supporting the deer (e.g. rope) to collect insects that attempt to climb upwardly upon the animal 12 while hanging.

Figure 5:
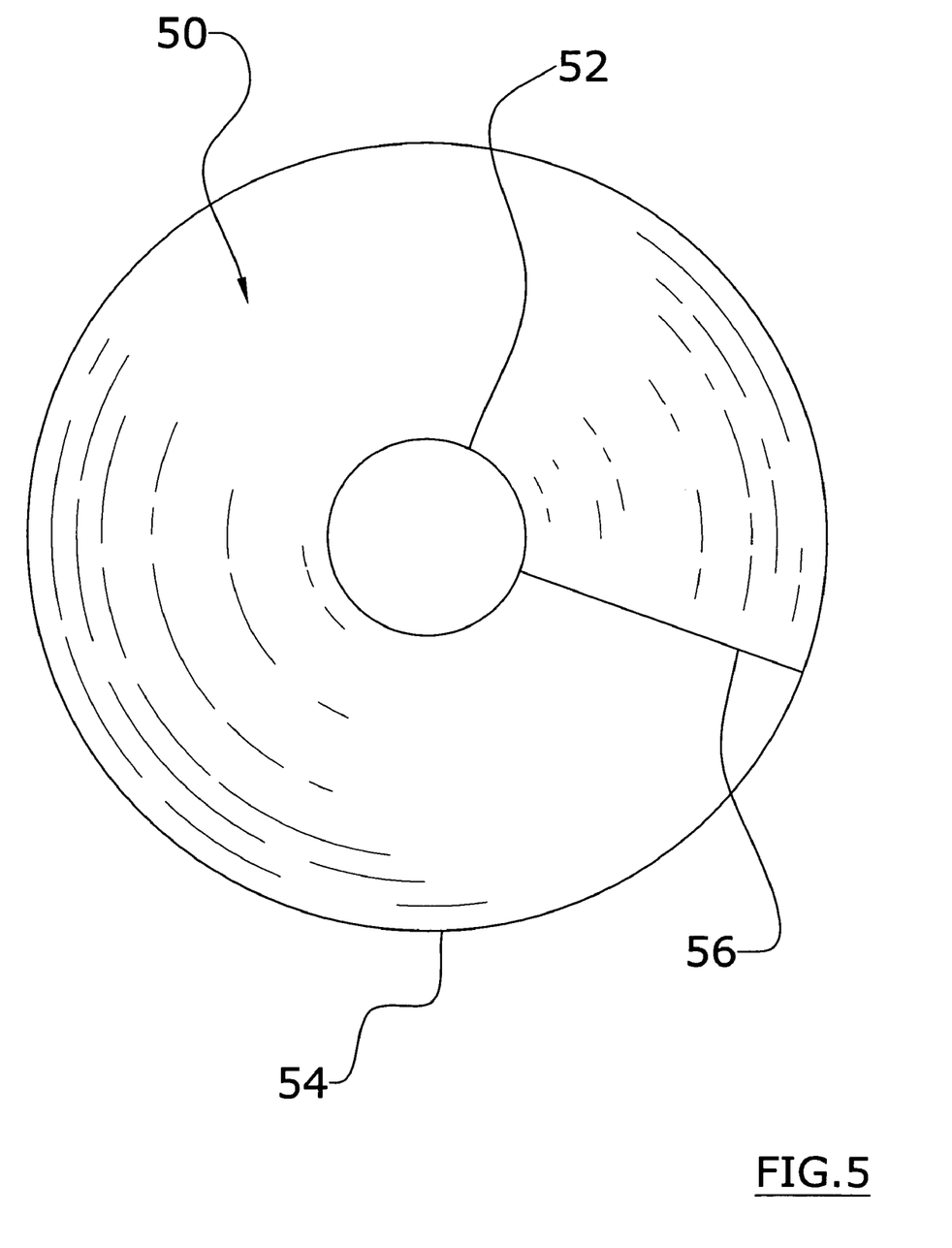
FIG. 5 is a top view of the cuff.

The cuff 50 preferably includes a slit 56 extending from an upper end 52 to a lower end 54 of the cuff 50 for allowing positioning about a leg of the animal 12 as illustrated in FIG. 5 of the drawings. The upper end 52 and the lower end 54 of the cuff 50 preferably are open for receiving the leg or the other structure in a surrounding manner.

F. Absorbent Material

A volume of absorbent material 22 is attached within the center zone for collecting the bodily fluids (e.g. blood) that escape the body of the animal 12 during hanging. The absorbent material 22 may be comprised of any material capable absorbing and retaining fluids. The absorbent material 22 preferably is infused with an anti-bacterial agent for assisting in preventing the risk of disease.

G. Adhesive

The adhesive 24 is attached within the at least one surrounding zone and to an interior surface of the cuff 50 for catching insects. The adhesive 24 may be comprised of any adhesive 24 material capable of catching and securing insects (e.g. ticks, fleas, lice). A covering may be utilized to cover the adhesive 24 in the center zone and the surrounding zones which is well known in the art.

H. Operation of Invention

Figure 1:
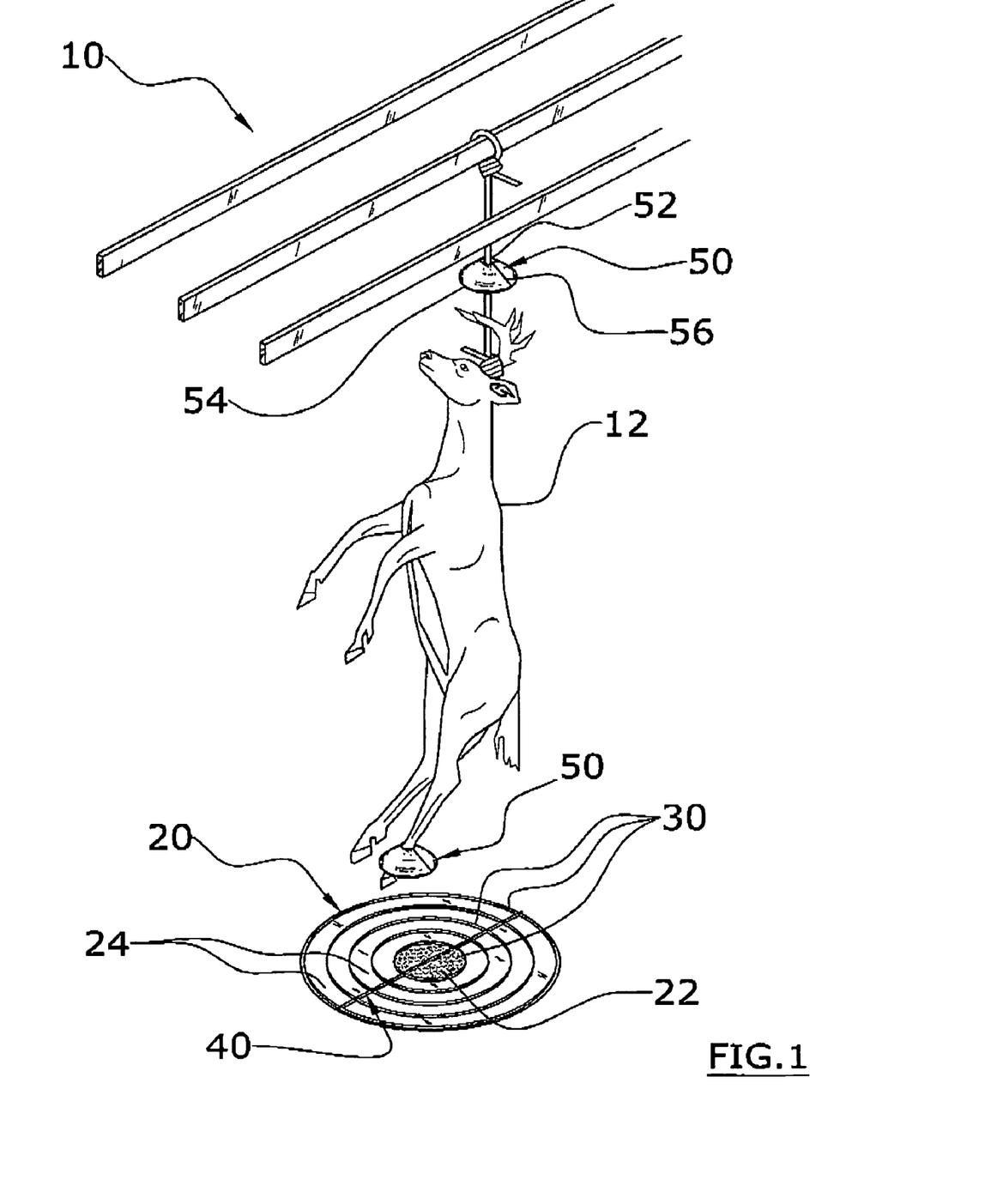
FIG. 1 is an upper perspective view of the present invention in use.

In use, the user first hangs the animal 12 utilizing various hanging techniques (rope attached by the horns as shown in FIG. 1 or by a gambrel attached to two legs of the animal 12). If a rope is used to support the animal 12 as illustrated in FIG. 1 of the drawings, the cuff 50 is positioned about the rope. If a gambrel is utilized to support the animal 12 (not shown), then two cuffs 50 are preferably utilized with one cuff 50 positioned about each of the legs attached to the gambrel. The cuffs 50 are positioned so that the interior surface of the cuff 50 containing the adhesive 24 faces downwardly to collect the insects as they attempt to climb out.

The user then positions the collection mat 20 centrally below the animal 12 as illustrated in FIG. 1 of the drawings. As the bodily fluids of the animal 12 drip off the body of the animal 12, they are collected within the absorbent material 22 in the central zone. As the insects drop off the animal 12, they either land within the absorbent material 22 or directly on the adhesive 24. If the insects land within the absorbent material 22, they are trapped within the adhesive 24 as they attempt to move outwardly from the absorbent material 22. After a period of time (e.g. two days), the user may then proceed with the processing of the animal 12 and dispose of the collection mat 20 containing the insects attached to the adhesive 24 within. In addition, the cuff 50 is also disposed of that contains the insects that attempted to climb upwardly upon the animal 12.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. An insect trap system, comprising:
    a collection mat having a floor, wherein said collection mat is positionable beneath an animal;
    a plurality of dividers extending from said floor defining a center zone and at least one surrounding zone;
    a cuff having a substantially conical shape;
    a slit extending from an upper end to a lower end of said cuff, wherein said slit allows said cuff to be expanded and wherein a leg of said animal is extendable through said slit;
    an absorbent material attached within said center zone; and
    an adhesive attached within said at least one surrounding zone and to an interior surface of said cuff for catching insects.

2. The insect trap system of claim 1, wherein said collection mat includes a folding portion.

3. The insect trap system of claim 2, wherein said folding portion extends across said collection mat.

4. The insect trap system of claim 2, wherein said folding portion is comprised of a first portion extending from a first half of said collection mat, a second portion extending from a second half of said collection mat, and a hinge attached to said first portion and said second portion.

5. The insect trap system of claim 4, wherein said hinge is integrally formed with said first portion and said second portion.

6. The insect trap system of claim 1, wherein said plurality of dividers are concentrically positioned upon said collection mat.

7. The insect trap system of claim 6, wherein said plurality of dividers each have upper ends that engage one another when said first half of said collection mat is folded upon said second half of said collection mat.

8. The insect trap system of claim 1, wherein said collection mat has a circular shape, wherein said center zone has a circular shape, and wherein said at least one surrounding zone has a circular shape.

9. The insect trap system of claim 1, wherein said center zone has at least a ten inch diameter and wherein said collection mat has at least a three foot diameter.

10. An insect trap system, comprising:
    a collection mat having a floor and a folding portion, wherein said collection mat is positionable beneath an animal;
    a plurality of dividers concentrically extending from said floor defining a center zone and at least one surrounding zone;
    a cuff having a substantially conical shape;
    a slit extending from an upper end to a lower end of said cuff, wherein said slit allows said cuff to be expanded and wherein a leg of said animal is extendable through said slit;
    an absorbent material attached within said center zone; and
    an adhesive attached within said at least one surrounding zone and to an interior surface of said cuff for catching insects;
    wherein said folding portion extends across said collection mat;
    wherein said folding portion is comprised of a first portion extending from a first half of said collection mat, a second portion extending from a second half of said collection mat, and a hinge attached to said first portion and said second portion, wherein said hinge is integrally formed with said first portion and said second portion;
    wherein said plurality of dividers each have upper ends that engage one another when said first half of said collection mat is folded upon said second half of said collection mat;
    wherein said collection mat has a circular shape, wherein said center zone has a circular shape, and wherein said at least one surrounding zone has a circular shape;
wherein said center zone has at least a ten inch diameter and wherein said collection mat has at least a three foot diameter.

* * * * *